(12) United States Patent
Williamson

(10) Patent No.: US 8,156,831 B2
(45) Date of Patent: Apr. 17, 2012

(54) APPARATUS, METHOD AND SYSTEM FOR REDUCING ADHESIVE WEAR ON A POWER TAKE-OFF SHAFT

(75) Inventor: Warren D. Williamson, Palmdale, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 879 days.

(21) Appl. No.: 12/128,243

(22) Filed: May 28, 2008

(65) Prior Publication Data

US 2009/0293652 A1 Dec. 3, 2009

(51) Int. Cl.
*F16H 37/00* (2006.01)
(52) U.S. Cl. .......................................................... 74/11
(58) Field of Classification Search ............. 74/11, 15.2, 74/15.86, 15.88; 192/48.1
See application file for complete search history.

(56) References Cited

U.S. PATENT DOCUMENTS

| | | | | |
|---|---|---|---|---|
| 2,778,066 | A | * | 1/1957 | Walmsley ...................... 384/280 |
| 2,835,540 | A | * | 5/1958 | Jorgensen ........................ 384/42 |
| 3,754,411 | A | | 8/1973 | Orain |
| 4,381,737 | A | * | 5/1983 | Turner .......................... 123/41.4 |
| 5,275,206 | A | * | 1/1994 | Acker ....................... 137/625.46 |
| 6,098,753 | A | * | 8/2000 | Lamarre et al. ............... 184/6.11 |
| 2002/0185794 | A1 | * | 12/2002 | Vincent ......................... 266/280 |
| 2006/0207254 | A1 | * | 9/2006 | Labala ......................... 60/605.3 |

FOREIGN PATENT DOCUMENTS

| | | |
|---|---|---|
| EP | 0 306 352 | 3/1989 |
| EP | 1 148 258 | 10/2001 |
| FR | 2 048 602 | 3/1971 |

* cited by examiner

*Primary Examiner* — Vicky Johnson
(74) *Attorney, Agent, or Firm* — McDermott Will & Emery LLP

(57) ABSTRACT

An apparatus comprising a power take-off shaft includes an outer shaft and an inner shaft. The outer shaft includes an outer periphery and an inner periphery. The inner shaft includes an outer periphery and an inner periphery. A notch is configured around at least a portion of the outer periphery of the inner shaft, and a self-lubricating material is disposed on at least a portion of the notch.

7 Claims, 4 Drawing Sheets

APPARATUS, METHOD AND SYSTEM FOR REDUCING ADHESIVE WEAR ON A POWER TAKE-OFF SHAFT

BACKGROUND

A power take-off (PTO) shaft is a splined driveshaft that can be used to draw energy from an engine to provide power to an attachment or separate machine. PTOs typically include an inner shaft that rotates and translates within an outer shaft. Certain areas of a power take-off shaft may develop adhesive wear caused by vibration and repetitive movement between the inner shaft and outer shaft. The adhesive wear can cause binding between the inner shaft and outer shaft, and in extreme cases, can prevent movement between the components. When at PTO shaft fails due to adhesive wear, the inner and outer shaft need to be replaced resulting in maintenance cost and equipment downtime.

SUMMARY

An apparatus comprising a power take-off shaft includes an outer shaft and an inner shaft. The outer shaft includes an outer periphery and an inner periphery. The inner shaft includes an outer periphery and an inner periphery. A notch is configured around at least a portion of the outer periphery of the inner shaft, and a self-lubricating material is disposed on at least a portion of the notch.

BRIEF DESCRIPTION OF THE FIGURES

Embodiments disclosed herein may be better understood, and their numerous objects, features, and advantages made apparent to those skilled in the art by referencing the accompanying drawings. The use of the same reference symbols in different drawings indicates similar or identical items.

DETAILED DESCRIPTION OF THE FIGURES

Figure 1A:
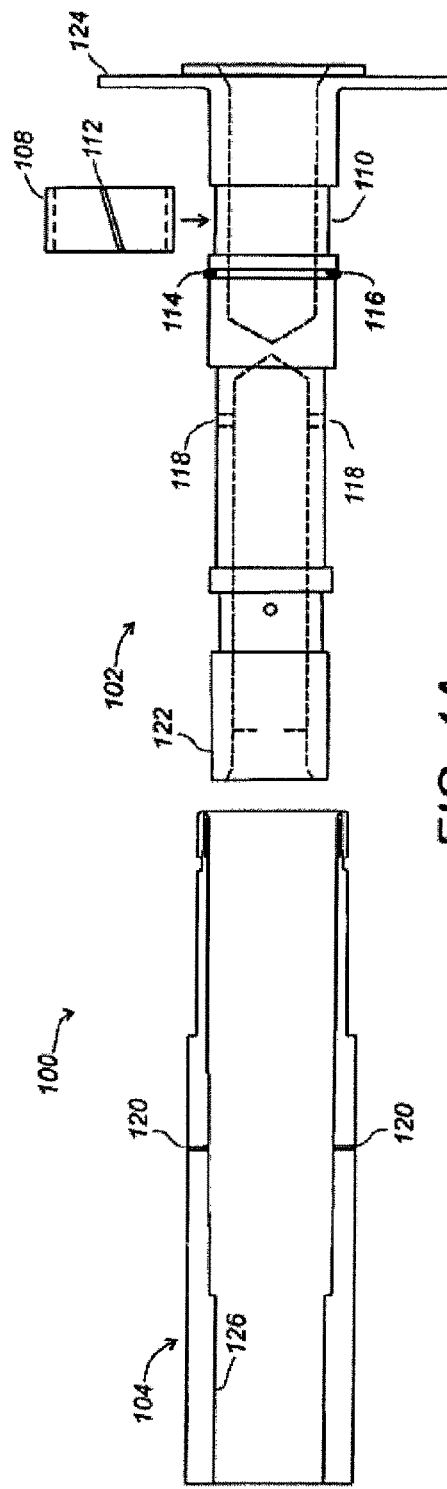
FIG. 1A is a cross-sectional view of components of an embodiment of a power take-off shaft.

FIG.1A shows a side view of an embodiment of a power take-off (PTO) shaft 100 that can be used to transmit power from an engine to other equipment such as a gear box. In the embodiment shown, PTO shaft 100 includes an inner shaft 102 and outer shaft 104 that engages inner shaft 102.

Figure 1C:
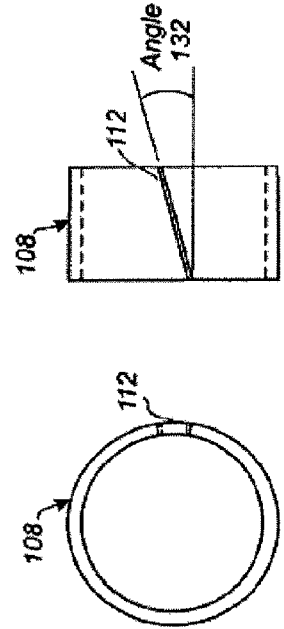
FIG. 1C is a diagram of a side view of an embodiment of a self-lubricating sleeve that may be used on the power takeoff shaft of FIG. 1A.
Figure 1D:
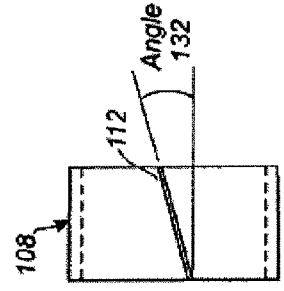
FIG. 1D is a diagram of a front view of the self-lubricating sleeve of FIG. 1B.
Figure 1B:
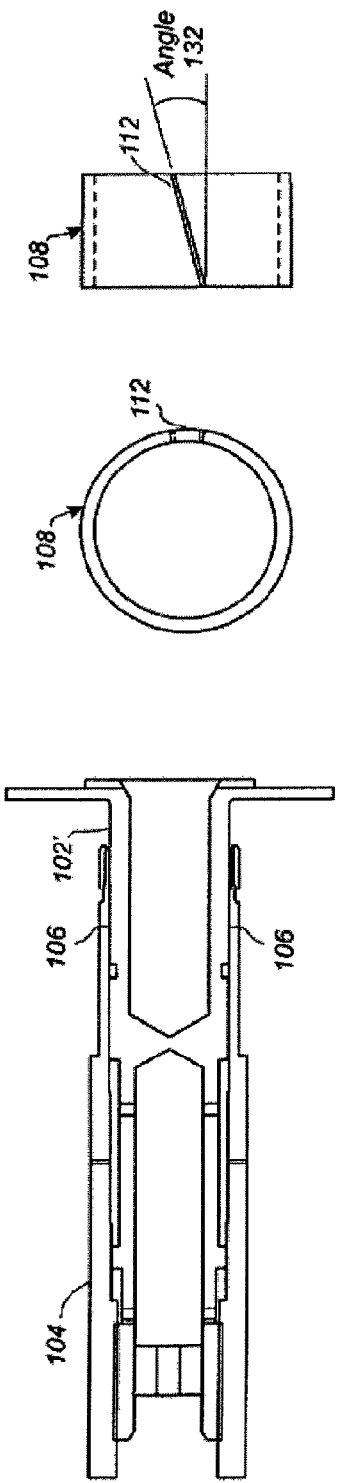
FIG. 1B is a side cross-sectional view of a conventional power take-off shaft.

FIG. 1B shows a conventional power takeoff shaft including an area 106 along a portion of the length of shafts 102, 104 that may be subject to adhesive wear caused by inner shaft 102' moving within outer shaft 104. Adhesive wear is also known as scoring, galling, or seizing, and occurs when two solid surfaces slide over one another under pressure. Surface projections are plastically deformed and eventually welded together by the high local pressure. As sliding continues, the welded bonds are broken, producing cavities on one surface, projections on the other surface, and frequently tiny, abrasive particles, all of which contribute to wear of the surfaces. The wear results in the outer shaft 102' and/or inner shaft 104 having to be removed from the equipment, discarded or repaired, and then reinstalled in the equipment.

Referring again to FIG. 1A, in some embodiments, a sleeve 108 made of self-lubricating material can be placed in a notch 110 on the outer periphery of inner shaft 102 to physically separate the inner shaft 102 and outer shaft 104. The self-lubricating sleeve 108 reduces adhesive wear by providing a self-lubricated surface that supports contact between the inner and outer shafts 102, 104, thereby preventing the inner shaft 102 and outer shaft 104 from coming into direct contact during operation. FIG. 1A shows sleeve 108 separate from inner shaft 102 and including a slot 112 that allows the ends of sleeve 108 to be separated to create space to allow sleeve 108 to be disposed in notch 110. Sleeve 108 can be made of resilient material that allows sleeve 108 to be easily removed and replaced while shafts 102, 104 are installed in the equipment, thereby reducing maintenance costs and equipment downtime.

In the embodiment shown, inner shaft 102 can further include o-ring 114 disposed in groove 116 to seal lubricating oil between another portion of the lengths of inner shaft 102 and outer shaft 104. Inner shaft 102 and outer shaft 104 can include one or more openings 118, 120 to allow lubricating oil to flow between the shafts 102, 104.

A spline gear 122 can be configured around the periphery of one end inner shaft 102 while another end of inner shaft 102 can include a flange 124 for mounting shaft 102 on equipment. The internal periphery of one end of outer shaft 104 can include a spline gear 126 that mates with the spline gear 122 of inner shaft 102. Spline gears 122, 126 rotate to transfer power from equipment attached to the flange 124 of inner shaft 122 to equipment attached to outer shaft 104.

In an embodiment, gears 122, 126 are configured without an angle so that the gear teeth are parallel to the axis of shafts 102, 104. In this configuration shaft 102 rotates and transmits power to outer shaft 104. The linear configuration of gears 122, 126 allows outer shaft 104 to move axially over shaft 102 with minimal resistance. Shaft 102 and outer shaft 104 typically have an internal periphery and an external periphery. The distance between the internal and external periphery of each shaft 102,104 is the shaft thickness; although this thickness may vary over the length of the shaft. The thickness of each shaft is sufficient to transmit the maximum force to be transmitted by PTO shaft 100.

FIGS. 1C and 1D depict respective end and side views of sleeve 108 including slot 112. Slot 112 allows sleeve 108 to be opened and closed to be removed and replaced on shaft 102 without disconnecting shaft 102 from the equipment. Slot 112 can be made at an angle so that regardless of the load direction, the shaft 102 will always bear against a solid section of sleeve 108. The spacing of slot 112 is typically kept to a minimum and sized to prevent binding due to thermal expansion. In some applications, slot 112 is 0.020-0.040 inches, but other suitable gap sizes can be used. Slot 112 can be oriented at an angle typically ranging from from 10 to 45 degrees. For example, in some embodiments, slot 112 is oriented at a 15 degree angle.

In some embodiments, the thickness of sleeve 108 is designed to protrude a predetermined amount, for example 0.04" or other suitable distance, above the adjacent periphery of shaft 102. The exact thickness of sleeve 108 may be chosen to be large enough to separate shaft 102 from outer shaft 104, but small enough not to cause excess interference. Manufacturing sleeve 108 from a non-metallic material can help reduce heat buildup, vibration and corrosion between sleeve 108 and shaft 102 and also between sleeve 108 and outer shaft 104.

Sleeve 108 may be made from acetal, fluoroplymer, nylon, or other suitable material. RULON® is a specially compounded fluoropolymer, which may be particularly suitable for use as sleeve 108 due to its low coefficient of friction and an excellent abrasion resistance to corrosion. Rulon requires no lubrication and may perform well under severe temperature (−400° to +550° F.) and corrosive conditions. In particular, Rulon has increased wear resistance, lower deformation under load, greater stiffness and higher compressive strength than nylon. Rulon is commercially available from Saint Gobain Performance Plastics in Aurora, Ohio, which is a division of Saint Gobain Company of Courbevoie France.

Figure 2A:
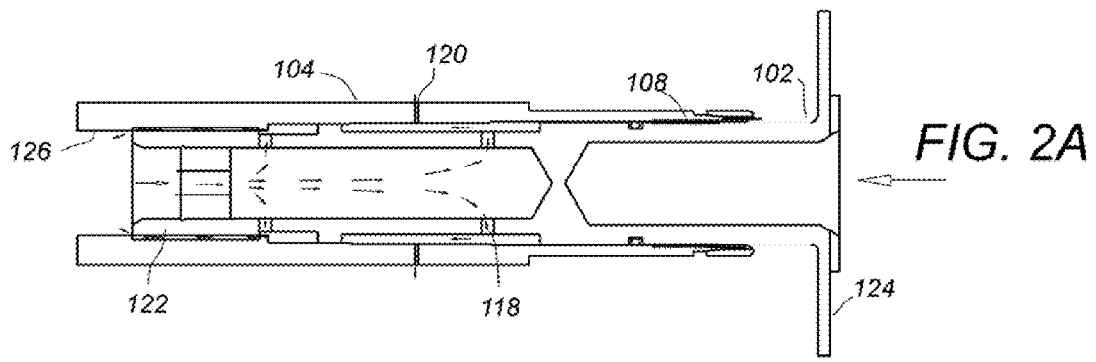
FIG. 2A is a cross-sectional view of an embodiment of an inner shaft partially engaged in an outer shaft.
Figure 2B:
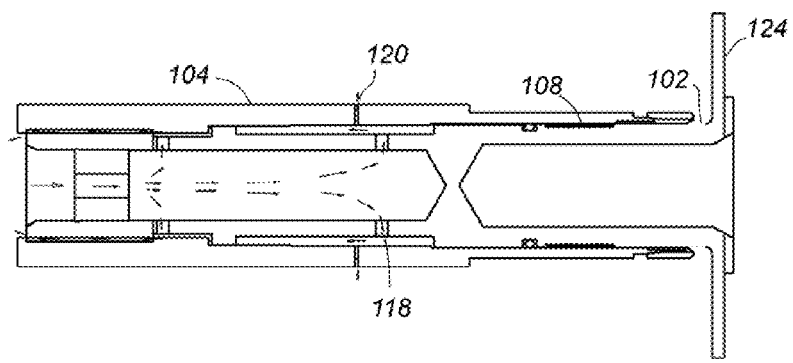
FIG. 2B is a cross-sectional view of an embodiment of the inner shaft of FIG. 2A more fully engaged in the outer shaft.

FIG. 2A is a cross-sectional view of an embodiment of inner shaft 102 partially engaged in outer shaft 104. FIG. 2B is a cross-sectional view of the inner shaft 102 of FIG. 2A more fully engaged in the outer shaft 104. FIGS. 2A and 2B also include a series of arrows depicting the flow direction of lubricating oil from an external pump to the internal periphery of shaft 102. From the internal periphery of shaft 102 the lube oil flows to the outer periphery of shaft 102 through lube oil return holes 118. From the outer periphery of shaft 102 the lube oil may return to the lube oil system (not shown) through lube oil return holes 120 in outer shaft 104. The number and diameter of lube oil return holes 118 and 120 are designed to maintain a predetermined flow and pressure at various parts of the system, including the interface of spline 122 and spline 126. If the number and/or diameter of lube oil return holes 118 and/or 120 is too small, the flow will be restricted and insufficient oil will be provide to lubricate splines 122, 126. If the number and diameter of lube oil return holes 118 and 120 are too large, then the flow to splines 122, 126 may be sufficient, but the flow to other parts of the system may be insufficient.

Figure 2C:
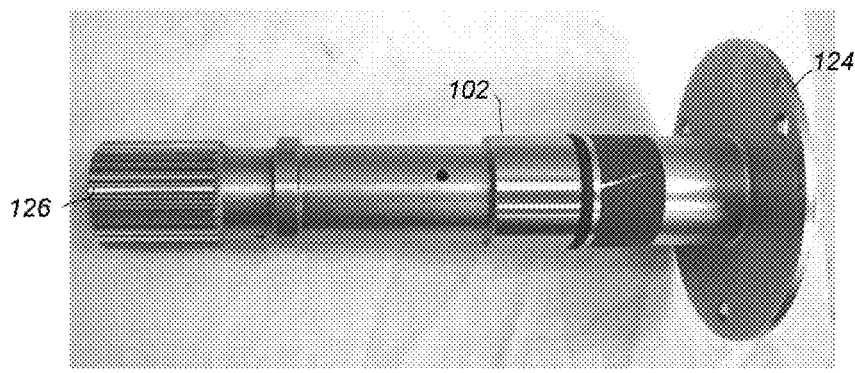
FIG. 2C is a perspective view of an embodiment of the inner shaft of the power take off shaft of FIG. 1A.

FIG. 2C is a side perspective view of an embodiment of the inner shaft 102 showing splines 122 in more detail. Splines 122 are configured to allow linear movement between inner shaft 102 and outer shaft 104. Thus, PTO shaft 100 may function as an expansion joint between equipment mounted to shafts 102, 104.

Figure 3:
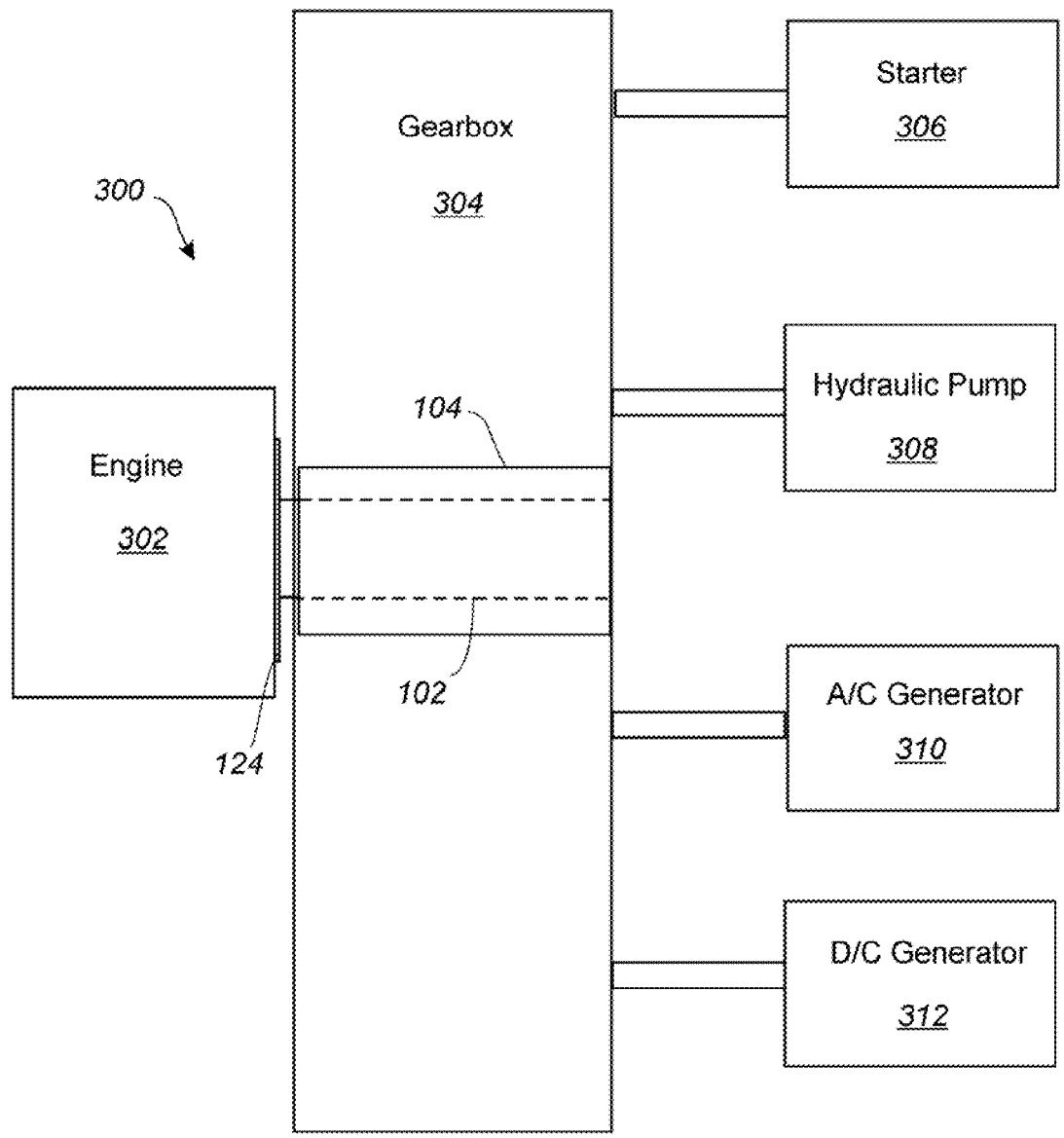
FIG. 3 is a block diagram of an embodiment of a power take-off shaft coupled between an engine and a gear box, including components coupled to the gear box

Referring to FIG. 3, a block diagram of an embodiment of system 300 is shown including inner shaft 102 and outer shaft 104 coupled between engine 302 and gear box 304. In the embodiment shown, shaft 102 can be coupled to engine 302 by flange 124. Outer shaft 104 is configured in gear box 304 to drive various components such as starter 306, hydraulic pump 308, alternating current ("A/C") generator 310, and direct current ("D/C") generator 312. When necessary, starter 306 may provide power through gear box 304 to start engine 302. Note that other suitable equipment can be coupled to gear box 304.

Figure 4:
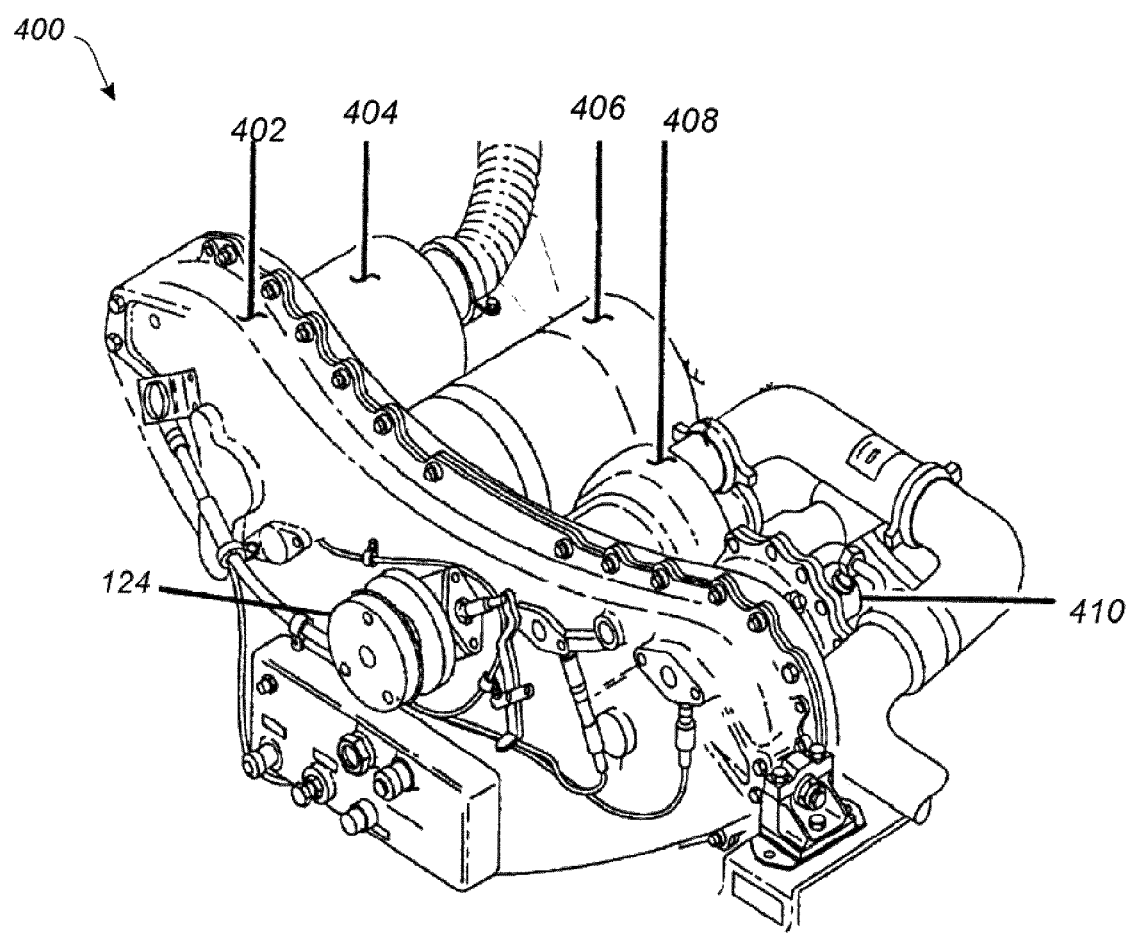
FIG. 4 is a diagram of an embodiment of a power take-off shaft coupled to an accessory drive gear box.

Referring to FIGS. 1 and 4, a diagram of an embodiment of system 400 is shown with PTO 100 installed in Airframe Mounted Accessory Drive (AMAD) gear box 402. Gear box 402 is configured to drive D/C generator 404, Ale generator 406, starter 408 and hydraulic pump 410. Flange 124 may be coupled to a flange on the engine (not shown). PTO shaft 100 often experiences adhesive wear that prevents shaft axial movement, increasing stresses in PTO shaft 100. The wear results in the inner shaft 102 having to be discarded and replaced during phase inspections. The outer shaft 104 also wears beyond limits resulting in the gear box 402 being removed from the aircraft and returned to the vendor prior to its normal life cycle. The premature wear poses a significant cost and maintenance issue with some aircraft programs. Using sleeve 108 helps prevent the gear box 402 from having to be removed from the aircraft and returned to the vendor for repair prior to completing its full life cycle. Sleeve 108 also helps prevent having to discard the inner shaft 102 at each inspection. Note that existing shafts 102 can be retrofitted with notch 110, thereby extending the life of PTO shafts 100 currently in service.

While the present disclosure describes various embodiments, these embodiments are to be understood as illustrative and do not limit the claim scope. Many variations, modifications, additions and improvements of the described embodiments are possible. For example, those having ordinary skill in the art will readily implement the processes necessary to provide the structures and methods disclosed herein. Variations and modifications of the embodiments disclosed herein may also be made while remaining within the scope of the following claims. The functionality and combinations of functionality of the individual modules can be any appropriate functionality. Additionally, limitations set forth in publications incorporated by reference herein are not intended to limit the scope of the claims. In the claims, unless otherwise indicated the article "a" is to refer to "one or more than one".

I claim:

1. A power take-off shaft comprising:
    a first shaft means comprising an outer periphery, a proximal end, a distal end, a spline gear means proximate to the proximal end, and a notch proximate to the distal end;
    a second shaft means configured to fit over at least a portion including the notch of the first shaft means, the second shaft means comprising a spline gear means proximate to the proximal end, the spline gear means of the second shaft configured to cooperate with the spline gear means of the first shaft so as to prevent rotary motion of the first shaft with respect to the second shaft;
    a self-lubricating sleeve means disposed on the notch of the first shaft means, the sleeve means configured to contact both the first shaft means and the second shaft means; and
    a sealing means disposed on the first shaft means between the spline means and the sleeve means, the sealing means configured to sealingly contact the first shaft means and the second shaft means so as to resist movement of lubricating oil from the proximal end to the distal end.

2. The power take-off shaft of claim 1, wherein the self-lubricating sleeve means comprises a material chosen from one of the following group of materials: a fluoropolymer, a polytetrafluoroethylene (PTFE), a nylon, an acetal, and a non-metallic material.

3. The power take-off shaft of claim 1, wherein the self-lubricating sleeve means comprises:
    a proximate side and a distal side; and
    a slot extending from the proximate side of the sleeve means to the distal side of the sleeve means.

4. A system, comprising:
    an engine;
    a first shaft coupled to the engine at a distal end, the first shaft comprising an axis, an outer periphery with a notch proximate to the distal end, and a spline proximate to a proximal end;

a gear box coupled to at least one of the group consisting of: a starter; a direct current generator; an alternating current generator, a hydraulic pump, and a starter motor;

a second shaft disposed within the first shaft and coupled at a proximal end to the gear box, the second shaft comprising an inner periphery with a spline at a proximal end, wherein the inner periphery of the second shaft is larger than the outer periphery of the first shaft so as to form a gap, and wherein the spline of the second shaft is configured to mate with the spline of the first shaft and prevent the first shaft from rotating with respect to the second shaft;

a self-lubricating sleeve disposed on the notch, wherein the sleeve is configured to fill the gap between the first and second shafts; and an o-ring disposed on the first shaft between the spline and the notch, the o-ring configured to sealingly contact both the first and second shafts and to resist the movement of lubricating oil from the spline to the notch.

5. The system of claim 4, wherein the self-lubricating sleeve is manufactured from of one of the following group of materials: a fluoropolymer, a PTFE, an acetal, a nylon, and a non-metallic material.

6. The system of claim 4, wherein the self-lubricating sleeve comprises a hollow cylinder that comprises a proximate side, a distal side, and a slot from the proximate side of the sleeve to the distal side of the sleeve.

7. The system of claim 4, wherein a thickness of the self-lubricating sleeve is greater than a depth of the notch.

\* \* \* \* \*